United States Patent [19]
Bendel

[11] 3,826,878
[45] July 30, 1974

[54] ECHO SUPPRESSOR FOR A SPEECH CIRCUIT IN A FOUR-WIRE TRANSMISSION SYSTEM

[75] Inventor: Hermann Bendel, Munich, Germany

[73] Assignee: Siemens Aktiengesellschaft, Berlin & Munich, Germany

[22] Filed: Oct. 20, 1971

[21] Appl. No.: 191,011

[30] Foreign Application Priority Data
Nov. 3, 1970 Germany ........................... 2054073

[52] U.S. Cl. ......... 179/170.6, 179/170.8, 179/170.2
[51] Int. Cl. ............................................. H04b 3/20
[58] Field of Search ........... 179/170.2, 170.6, 170.8, 179/81 A, 1 VC, 1 HF

[56] References Cited
UNITED STATES PATENTS
3,560,669 2/1971 Foulkes ........................... 179/170.6
3,567,873 3/1971 Peroni ............................. 179/170.2

*Primary Examiner*—Kathleen H. Claffy
*Assistant Examiner*—Alan Faber
*Attorney, Agent, or Firm*—Hill, Gross, Simpson, Van Santen, Steadman, Chiara & Simpson

[57] ABSTRACT

An echo suppressor for a speech circuit in a four-wire transmission system is inserted into the two transmission directions which are regarded as a transmission path and a receiving path, respectively, with respect to a hybrid connecting the four-wire system to a two-wire system. The echo suppressor has a suppression member connected in the transmission path and controlled with the help of transmission side and receiving side speech detectors. Each of the speech detectors includes filtering means defining at least two speech frequency ranges, and means are provided for controlling the operation of the suppression member in response to speech signal detection wherein detection of speech signal conditions does not necessarily effect or eliminate suppression in the transmitting path.

4 Claims, 3 Drawing Figures

INVENTOR
Herman Bendel
BY
Hill, Sherman, Meroni, Gross & Simpson
ATTYS.

INVENTOR
Herman Bendel
BY
Hill, Sherman, Meroni, Gross & Simpson
ATTYS.

ECHO SUPPRESSOR FOR A SPEECH CIRCUIT IN A FOUR-WIRE TRANSMISSION SYSTEM

BACKGROUND OF THE INVENTION

1. Field of the Invention

This invention relates to an echo suppressor for a speech circuit which is inserted into the two transmission directions of a four-wire transmission system which are regarded as the transmitting path and the receiving path with respect to a hybrid connecting the four-wire system to a two-wire system, and which has a suppression member in the transmitting path which is controlled by evaluation means connected to both paths such that when speech signals occur in the receiving path, suppression of the transmitting path is effected if an evaluation of the difference of the speech signals in the two paths does not indicate double speaking.

2. Description of the Prior Art

An echo suppressor generally of the type mentioned above is known, for example, from the German published patent application No. 1,297,153. The object of this echo suppressor is to prevent speech signals from one of the subscribers during the transit time of the four-wire paths returning as an echo to the speaking subscriber after reflection at the far end of the path. In such apparatus, a pair of echo suppressors connected at respective ends of a four-wire transmission system each include a suppressing member in the transmitting direction with respect to a hybrid which connects the four-wire system to a two-wire system. In order to suppress echo signals, the suppression member is activated when the receiving path speech levels occur.

In a further improvement of such an echo suppressor, the output signals of a transmitting side speech detector and a receiving side speech detector are compared and if the speech signal levels in the receiving path exceed those in the transmitting path by a value, such as −31 dBm, the receiving side speech detector will effect an interruption of the transmitting path by way of the suppression member. The state of simultaneous speech in each path is sensed by way of a respective speech detector and rectifier which are serially interposed between the individual transmission paths and an evaluation device. If the evaluation of the relationship of the transmitting path speech level and the receiving path speech level indicates a state of double speaking (both subscribers speaking), the evaluation device will cause an interruption of the transmitting path at the suppression member until the double speaking state no longer exists.

A damping member may be inserted into the receiving path and constructed so as to usually be ineffective until activated by the evaluation device during a double speaking condition. The damping member may furthermore be designed in such a way that it decreases the dynamics in the receiving path.

If the distant subscriber speaks and the near subscriber makes short and not too loud intermediate remarks, it is basically very difficult for the echo suppressor to recognize the double speech condition in time to prevent clipping of initial syllables, since the transmitting path speech levels may come both from the interrupting subscriber and from the distant subscriber whose speech signals are damped a small amount, for example, about 6 dB, and may have reached the transmitting path input of the echo suppressor by way of the adjacent hybrid during a transmission damping of the hybrid which is not too good. Since, however, one must take into account such a low level of transmission damping from the hybrid side echo suppressor output toward the hybrid side echo suppressor input, the echo suppressor is usually, at best, able to safely recognize a double speaking condition and to switch through the transmitting path when the levels in the receiving path and the transmitting path are equal. Due to these difficulties, word distortions may occur at the initiation of double speaking and, under unfavorable conditions, during very soft speech and/or with good transmission damping, intermediate remarks and short answers may be clipped or even completely suppressed.

SUMMARY OF THE INVENTION

It is therefore the primary object of the present invention to provide an echo suppressor of the type initially mentioned in which the listening subscriber is afforded better opportunities to interrupt the speech of a speaking subscriber without speaking in a very loud voice.

According to the invention, the foregoing and other objects are realized in such a way that the two speech detectors respectively contain one of several filters, that the evaluation of the ratio between the output signals of the speech detectors is effected in at least two speech frequency ranges, which may possibly mutually overlap, and that the suppression of the transmitting path may be effected or eliminated, respectively, when the state of double speaking is detected even in only one of the speech frequency ranges.

The foregoing measures can essentially increase the interrupting sensitivity for short intermediate remarks of the listening subscriber into the speech of his speaking partner, i.e., the condition of double speaking can be detected more simply, faster and more safely, which permits short intermediate remarks to be switched through sufficiently fast so that they reach the speaking subscriber in good quality and with a minimum amount of clipping. Therefore, the mutual information contact of the two subscribers is essentially improved.

In a further development of the invention, one or several control members can be inserted into the measuring path or paths, respectively, for the evaluation of the difference of the speech levels which, starting at the beginning of a telephone connection, cause a single increase in the evaluation or a higher evaluation of the transmitting path speech levels with respect to those of the receiving path, increasing steadily or in stages, in particular during the time of suppression of the transmitting path by the suppression member. Therefore, an automatic adaptation of the echo suppressors to the respective circulation damping and final echo transit time is obtained which enables an increase in the interrupting sensitivity up to the limits of the associated hybrid circuits.

BRIEF DESCRIPTION OF THE DRAWINGS

Other objects, features and advantages of the invention, its organization, construction and operation, will best be understood from the following detailed description and reference to the accompanying drawings, in which.

DESCRIPTION OF THE PREFERRED EMBODIMENT

Figure 1:
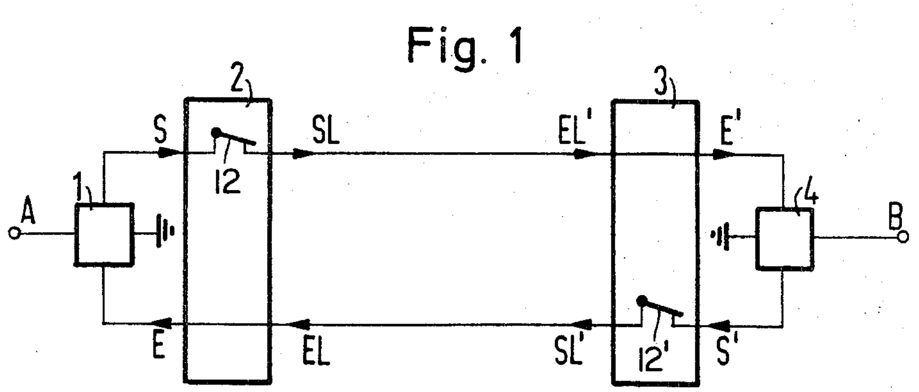
FIG. 1 is a schematic representation of a telephone transmission system including a four-wire transmission system which extends between two two-wire systems including a pair of echo suppressors.

Referring to FIG. 1, an echo suppressor such as disclosed in the above-identified German published patent application No. 1,297,153 is illustrated as connected in a four-wire transmission system. In FIG. 1, two subscribers A and B are interconnected by way of a hybrid 1, an echo suppressor 2, an echo suppressor 3 and a hybrid 4. The echo suppressors 2, 3 are respectively connected at the two ends of a four-wire transmission system and include a suppression member 12, 12′, respectively, in one of the transmission directions, which must be regarded as the transmitting path S or S′ with respect to the associated hybrid 1, 4, respectively. For suppression of echo signals, the suppressing members 12, 12′ are activated when speech signals occur in the respective receiving paths in order to interrupt the respective transmitting paths.

Figure 2:
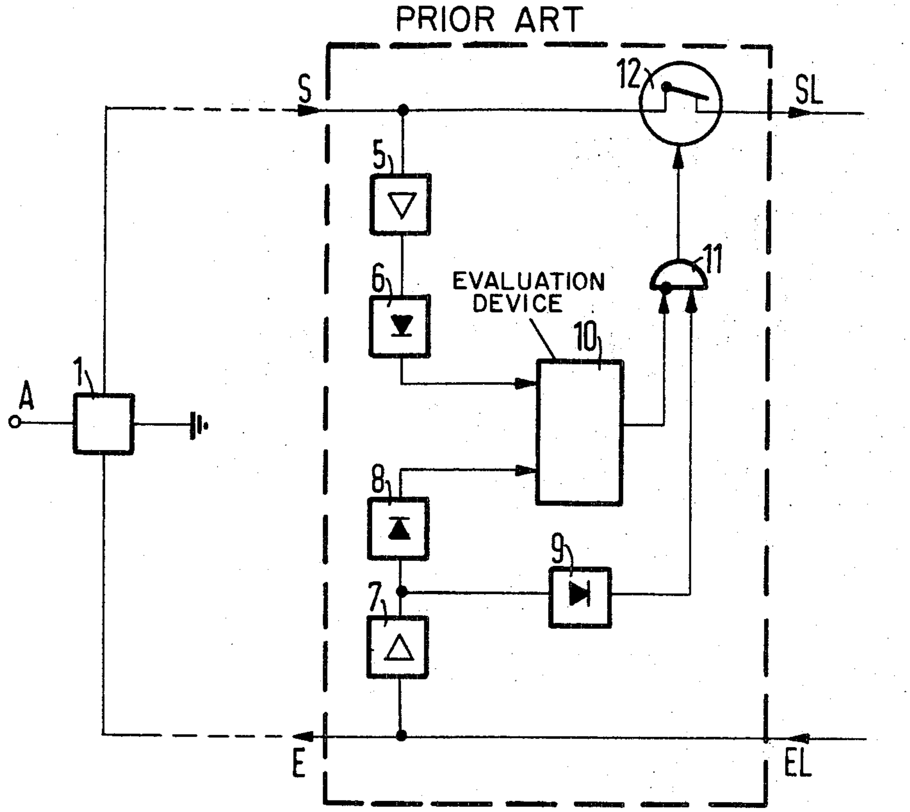
FIG. 2 is a schematic diagram of an echo suppressor in which suppression of the transmission path is controlled in accordance with the ratio of signal levels in both the transmitting and receiving paths.

A prior art type of echo suppressor 2 is illustrated in the arrangement of FIG. 2, which, in addition to the suppression member 12, has a transmitting path speech detector and a receiving path speech detector, as well as an evaluating device 10 and a gate 11. If speech signals occur in the receiving path EL–E, and exceed the addressing speech level by a certain value, such as −31 dBm, the receiving path speech detector 7 will cause operation of the suppression member 12 to interrupt the transmitting path S–SL by way of a rectifier 9 and the gate 11. The state of simultaneous speech of both subscribers is indicated by the evaluation device 10 which is controlled both from the receiving path EL–E via the speech detector 7 and a rectifier 8 and from the transmitting path S–SL by way of the speech detector 5 and a rectifier 6. If the evaluation of the relationship of the transmitting path speech level and the receiving path speech level indicates a state of double speaking, the evaluation device 10 will interrupt the control of the suppression member 12 by way of the gate 11, whereafter the latter will switch the transmitting path S–SL to again be permeable for speech signals.

A damping member (not illustrated) may be inserted into the receiving path EL–E. The damping member is normally not effective and is only activated in the case of a double speaking condition under the control of the evaluation device 10. This damping member may furthermore be designed in such a way that it decreases the dynamics in the receiving path EL–E.

If the distant subscriber B speaks and the near subscriber A makes short interruptive remarks which are not too loud, it is basically very difficult for the echo suppressor 2 to recognize a double speech condition in sufficient time, since the transmitting path speech levels may come from both the interrupting near subscriber A and from the distant subscriber B whose speech signals may have reached the transmitting path input S by way of the hybrid 1 and be damped only about 6 dB. Since, however, one must take such a practical consideration into account, such a low value of transmission damping from the hybrid side echo suppressor output E toward the hybrid side echo suppressor input S, the echo suppressor is usually, at best, able to safely recognize a double speaking condition and to switch the transmission path for permeation by speech signals when the levels in the receiving path E and in the transmitting path S are equal. Due to these difficulties, word distortions, such as clipping, may occur when the double speaking condition is initiated and, under unfavorable conditions such as during very soft speech and/or great transmission damping, intermediate remarks and short answers may be completely suppressed.

Figure 3:
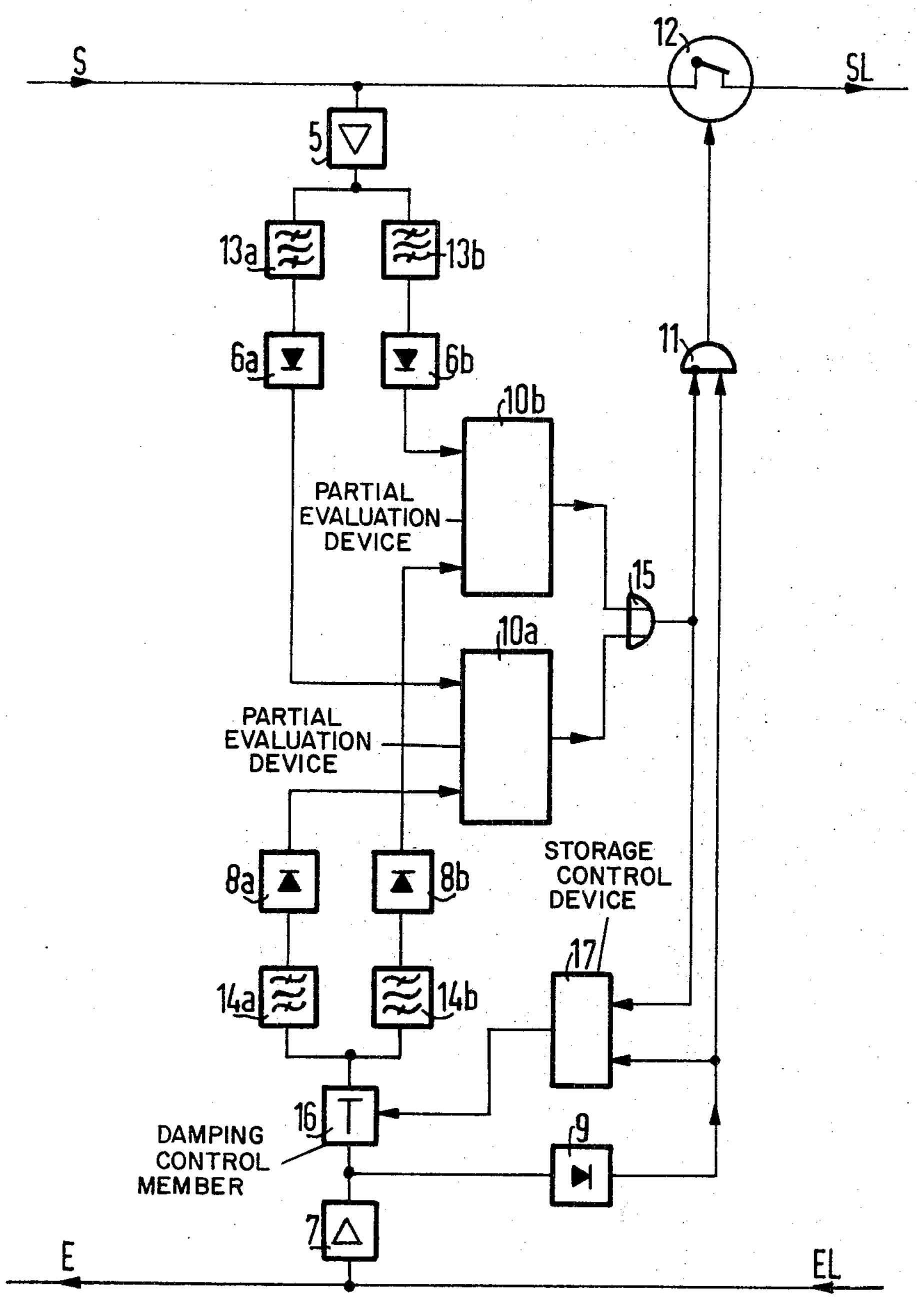
FIG. 3 is a schematic diagram of an echo suppressor constructed in accordance with the principles of the present invention.

FIG. 3 illustrates an echo suppressor constructed in accordance with the principles of the present invention and proceeding from the arrangement illustrated in FIG. 2. In the apparatus of FIG. 3, two filters are assigned to each transmission path and the evaluation device comprises a pair of partial evaluation devices **10*a* and 10*b* and an OR gate 15 connected to the outputs thereof. In this construction, two filters 13*a* and 13*b* are connected parallel to and at the output of the amplifier 5 on the transmitting side and are respectively connected to rectifiers 6*a* and 6*b*. On the receiving path side, two filters 14*a* and 14*b* are connected to the amplifier 7 by way of a control member 16 and are respectively connected to rectifiers 8*a* and 8*b***.

The two filters **13*a* and 14*a* are pass filters for a first partial frequency range and they control the first partial evaluation device 10*a*. Correspondingly, the two filters 13*b* and 14*b* are pass filters for a second partial frequency range of the speech spectrum and they control the second partial evaluation device 10*b*. The outputs of the two partial evaluation devices 10*a* and 10*b* are commoned by way of an OR gate 15 and control the operation of the gate 11 in such a manner that when a double speaking condition is detected in one of the two partial frequency ranges, activation of the suppression member 12** is not effected or eliminated, respectively, The two filter sets may be dimensioned in such a way that two partial frequency ranges are provided which follow one another and which comprise, for example, the frequencies 300 through 2,000 Hz, on one hand, and 2,000 through 3,400 Hz, on the other hand. Therefore, the speech levels at the outer band limits, 300 and 3,400 Hz are advantageously utilized only in a weakened state in order to protect the echo suppressor from faulty controls in response to interference voltages of lower or higher frequencies. However, a frequency division may also be provided in which two overlapping partial frequency ranges are defined. Therefore, it is possible, for example, to provide a first partial frequency range of from 300 through 3,400 Hz and a second partial frequency range of from 2,000 through 3,400 Hz.

In the prior art arrangement illustrated in FIG. 2, it may be necessary to provide relatively long double speech persistence times of 200 through 300 ms in order to guarantee that if both subscribers talk simultaneously for a relatively long period of time, the double speech condition is not lost between words. However, with the arrangement illustrated in FIG. 3, the persistence for a double speech condition is comparatively short, preferably equal to or smaller than 50 ms, since here the interrupting subscriber has the possibility at any time to interrupt the syllables and beginnings of words of his partner. With such a short double speech persistence, a damping member may be eliminated. Such a damping member can be inserted into the receiving path EL–E during the state of double speaking to increase the echo distance during such condition, since in this case echos can only occur during double speech, i.e., only as long as they are covered anyway by the speech signals of the interrupting subscriber.

A further increase of interruption sensitivity, while at the same time avoiding interruptions which may be caused by the echo signals themselves (false break-in) can be obtained by the provision of a control member 16 in the measuring path or paths for the evaluation of the ratio between the receiving path and the transmitting path speech levels. The control member, as can be seen from FIG. 3, is controlled by a storing control device 17 which is in turn controlled from the output of the amplifier 7 by way of a rectifier 9 in such a way that from the beginning of the telephone connection, and in particular during the time of suppression of the transmitting path, a single increase of the damping or a steadily or stepwise increase of damping of the control member 16 occurs. Therefore, increasingly higher evaluation of the transmitting path speech levels with respect to the receiving path speech levels is obtained during suitable time intervals by means of the evaluation device 10*a*, 10*b* up to an optimum sensitivity adjustment. Therefore, the listening subscriber will obtain the possibility of quickly interrupting the speech of his partner by relatively quiet intermediate remarks. The control member 16 might also be once adjusted to a higher damping state. A control member may also be inserted into the transmitting path side measuring path instead of in the receiving side measuring path, or in addition thereto, and may be designed in such a way that it causes a single increase or a continuous increase of the amplification, preferably during thhe time of suppression of the transmission path by the suppressing member 12. A correspondingly controlled amplifier in the transmitting side measuring path furthermore amplifies the echo for evaluation to support the effect of speech signals of the interrupting subscriber. The type of connection of the control member 16 in the receiving side measuring path for evaluation can result in the condition wherein speech levels in the transmitting path S which are lower than the simultaneously occurring speech levels in the receiving path E can cause a double speech condition. Favorably, this kind of circuit does not influence the speech level of, for example, −31 dBm for the activation of the suppression member 12 since the input of the rectifier 9 is connected directly to the output of the amplifier 7 and ahead of the control member 16.

Although I have described my invention by reference to a particular illustrative embodiment thereof, many changes and modifications of my invention may become apparent to those skilled in the art without departing from the spirit and scope thereof, and it is to be understood that I intend to include within the patent warranted hereon, all such changes and modifications as may reasonably and properly be included within the scope of my contribution to the art.

I claim:

1. An echo suppressor for a speech circuit in a four-wire transmission system which is connected into the two transmission directions which are regarded as a transmission path and a reception path, respectively, with respect to a four-wire/two-wire hybrid, said echo suppressor comprising: a wide band suppression member connected into said transmission path; wide band detection means connected to said reception path for evaluating the signal level in said reception path; a gate having a first input, a control input and an output, said first input connected to said wide band detection means, said output connected to said suppression member, said gate normally open and closed in response to the application of a signal to said control input to control the operation of said suppression member; first frequency selective means for at least two speech frequency ranges, said first frequency selective means connected to said wide band detection means for evaluating the signal levels of the respective frequency ranges in the reception path; second frequency selective means connected to said transmission path for evaluating the signal levels of at least two speech frequency ranges in said transmission path, the frequency ranges of said first frequency selective means corresponding to the frequency ranges of said second frequency selective means; at least two comparison devices each having two inputs and an output, one input of each device connected to said first frequency selective means and the other input of each device connected to said second frequency selective means for comparing the signal levels in the same frequency range and operable to provide a signal at said output when the signal level in the transmission path exceeds the signal level in the corresponding range in said reception path; and an OR gate having a pair of inputs connected to respective ones of said outputs of said comparison devices and an output connected to said control input of the first-mentioned gate to control the operation of said suppression member to effect a suppressing condition in response to the provision of an output signal from either of said comparison devices.

2. An echo suppressor as set forth in claim 1, wherein said first and second frequency selective means comprises filter means including means defining two frequency ranges which are within the speech band and adjacent each other at about 2,000 Hz.

3. An echo suppressor as set forth in claim 1, wherein said first and second frequency selective means comprises filter means including means defining two frequency ranges within the speech band which mutually overlap in about the upper third of the speech frequency band.

4. An echo suppressor as set forth in claim 1, wherein said first and second frequency selective means comprises filter means including means defining two frequency ranges 300–3,400 Hz and 2,000–3,400 Hz.

* * * * *